United States Patent
George et al.

(10) Patent No.: US 12,522,763 B1
(45) Date of Patent: Jan. 13, 2026

(54) RELATIVE PERMEABILITY MODIFIER PACKAGE FOR PRODUCED FLUIDS FROM A SUBTERRANEAN FORMATION

(71) Applicant: Halliburton Energy Services, Inc., Houston, TX (US)

(72) Inventors: Shoy George, Pune (IN); Larry Steven Eoff, Houston, TX (US); Jason Adam Denny, Houston, TX (US); Sunita S Kadam, Pune (IN); Sherif Eldin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/931,297

(22) Filed: Oct. 30, 2024

Related U.S. Application Data

(63) Continuation-in-part of application No. 18/931,238, filed on Oct. 30, 2024.

(51) Int. Cl.
*E21B 43/16* (2006.01)
*C09K 8/508* (2006.01)
*E21B 33/138* (2006.01)

(52) U.S. Cl.
CPC .......... *C09K 8/5083* (2013.01); *E21B 33/138* (2013.01); *E21B 43/16* (2013.01)

(58) Field of Classification Search
None
See application file for complete search history.

(56) References Cited

U.S. PATENT DOCUMENTS

| | | | |
|---|---|---|---|
| 6,476,169 B1 | 11/2002 | Eoff et al. | |
| 7,759,292 B2 * | 7/2010 | Eoff | C09K 8/5083 |
| | | | 166/305.1 |
| 2005/0230114 A1 | 10/2005 | Eoff et al. | |
| 2008/0110624 A1 | 5/2008 | Nguyen et al. | |
| 2009/0143256 A1 * | 6/2009 | Welton | C09K 8/72 |
| | | | 507/218 |
| 2009/0143257 A1 * | 6/2009 | Teng | C09K 8/508 |
| | | | 507/219 |
| 2012/0279704 A1 * | 11/2012 | Eoff | C09K 8/5751 |
| | | | 166/280.1 |
| 2015/0166866 A1 | 6/2015 | Dobson, Jr. et al. | |
| 2015/0315456 A1 | 11/2015 | Milne et al. | |
| 2017/0218261 A1 | 8/2017 | Nguyen | |
| 2018/0010432 A1 * | 1/2018 | Oehler | E21B 43/08 |

* cited by examiner

*Primary Examiner* — Andrew Sue-Ako
(74) *Attorney, Agent, or Firm* — Sheri Higgins Law, PLLC; Sheri Higgins

(57) ABSTRACT

A reservoir fluid can be produced from a subterranean formation. The reservoir fluid can include water and hydrocarbons such as oil. It is oftentimes desirable to limit the amount of water that is produced, so a higher ratio of hydrocarbons can be produced. Portions of the subterranean formation can have an initial permeability to water. A relative permeability modifier (RPM) package including a surfactant and a polymer can be used in these portions to restrict or prevent water from being produced. The relative permeability modifier package can increase the hydrophobicity of the portion that allows the hydrocarbons to flow through while substantially limiting the amount of water. The relative permeability modifier can coat the surfaces of substances in the formation whereby the permeability to an aqueous fluid is reduced from the initial permeability. The formation can be a high-temperature formation of 230° F. (110.0° C.) or greater.

20 Claims, No Drawings

RELATIVE PERMEABILITY MODIFIER PACKAGE FOR PRODUCED FLUIDS FROM A SUBTERRANEAN FORMATION

TECHNICAL FIELD

Relative permeability modifiers can be used to limit the amount of water produced from a subterranean formation while allowing production of a hydrocarbon liquid. A relative permeability modifier package that includes two or more relative permeability modifiers can be used in carbonate/sandstone-bearing areas of the formation having high permeabilities.

DETAILED DESCRIPTION

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

Hydrocarbons, for example oil and gas, can be produced from a subterranean formation. The subterranean formation can have different zones or regions that can also contain water in addition to the hydrocarbons. Oftentimes it is desirable to prevent or limit the amount of water that is produced along with hydrocarbons. If water is produced with hydrocarbons, then the water must be separated from the hydrocarbons and either disposed of, cleaned up, or injected back into another formation via an injection well. As production continues over time, the ratio of produced water to produced hydrocarbons can increase to the point that it presents a significant economic loss.

Relative permeability modifiers have been used to prevent or limit the amount of water that is produced. The relative permeability modifiers can adsorb onto the surfaces of substances, such as rocks including sandstone and minerals, making up the formation thereby rendering the surfaces hydrophobic. Hydrophobic materials repel water; whereas hydrophilic materials are attracted to water. Thus, substances of a formation that are hydrophilic will typically allow water to flow through the formation and into a wellbore; and substances that are hydrophobic will typically repel water, thus hindering its ability to flow through the formation. However, the relative permeability modifier's effectiveness depends on the type of substances of a subterranean formation as well as the permeability of the formation. By way of example, some polymers have been used effectively in sandstone-bearing formations and/or carbonate-bearing formations. However, these polymers may not be effective when the permeability of the formation is high (e.g., above 6 darcy "D"). As the permeability of the formation increases, the size of the pore throats also increases. As such, these polymers might not have the desired effectiveness possibly because the molecular weight of the polymers is not enough to decrease fluid flow through the larger pores. Other relative permeability modifiers, such as surfactants have been used effectively in sandstone-bearing formations and/or carbonate-bearing formations when the permeability of the formation is high. However, these surfactants may not be effective in higher temperature formations (e.g., above 200° F. (93.3° C.)). Thus, there is a need for relative permeability modifiers that can be used in high permeability, high-temperature formations.

A method of treating a portion of a subterranean formation can include introducing a fluid into the portion of the subterranean formation that has an initial permeability to an aqueous fluid, wherein the fluid comprises: a liquid; and a relative permeability modifier package, wherein the relative permeability modifier package comprises: a first relative permeability modifier that is a surfactant; and a second relative permeability modifier that is a polymer; and causing or allowing the first and second relative permeability modifiers to coat surfaces of the portion of the subterranean formation, wherein after coating, a final permeability to the aqueous fluid is reduced from the initial permeability.

The various disclosed embodiments can apply to all of the methods. As used herein, any reference to the unit "gallons" means U.S. gallons.

The portion of the subterranean formation can be part of a sandstone-bearing formation, a carbonate-bearing formation, or can include other types of substances. The portion of the subterranean formation can also include a variety of layers or strata that are composed of different substances. The subterranean formation can include one or more water-producing zones, oil-producing zones, or hydrocarbon gas producing zones. The various zones can make up the portion of the subterranean formation or be located adjacent to the portion of the subterranean formation. The subterranean formation can contain a reservoir fluid to be produced from the portion of the subterranean formation, called a production zone. The reservoir fluid can include aqueous fluids, such as freshwater or brine, or and hydrocarbons, such as liquid or gaseous hydrocarbons. The methods can further include producing the reservoir fluid from the subterranean formation. The reservoir fluid can flow through the portion of the subterranean formation and into a wellbore to a wellhead. It is to be understood that while the production zone may not include water producing zones, adjacent portions of the subterranean formation may include water producing zones whereby the aqueous fluid can be pulled from the adjacent portions and into the production zone. The fluid can also be introduced into more than one portion of the subterranean formation, for example, adjacent zones. The portion of the subterranean formation can have a bottomhole temperature greater than or equal to 200° F. (93.3° C.) or 230° F. (110.0° C.) or 250° F. (121.1° C.).

The portion of the subterranean formation (i.e., the production zone) can have varying initial permeabilities to an aqueous fluid. The portion of the subterranean formation can have, for example, an initial permeability to an aqueous fluid of greater than 4 Darcy (D). The portion of the subterranean formation can also have an initial permeability greater than 6 D, 10 D, greater than 15 D, or greater than 20 D. The aqueous fluid includes water and optionally a water-soluble salt. Permeability in this aspect is defined as the ability of fluids to flow through rock or other porous media. Permeability is calculated according to Darcy's law as shown in Equation 1 below.

$$Q = \frac{Ak\Delta P}{\mu \Delta x} \quad \text{Eq. 1}$$

where Q is the volumetric fluid flow rate through the medium;
A is the area of the medium;
k is the permeability of the medium;
$\Delta P$ is the applied pressure differential;
$\mu$ is the dynamic viscosity of the fluid; and
$\Delta x$ is the thickness of the medium.

By way of example, a medium with a permeability of 1 Darcy permits a flow of 1 cm³/s of a fluid with viscosity 1 centipoise (cP) (1 millipascal second "mPa·s") under a pressure gradient of 1 atm/cm acting across an area of 1 cm².

The fluid that is introduced into the portion of the subterranean formation includes a liquid. The liquid can comprise water. The water can be selected from the group consisting of freshwater, seawater, brine, and any combination thereof in any proportion. The liquid can further include a water-soluble salt. The salt can be selected from the group consisting of sodium chloride, sodium bromide, calcium chloride, calcium bromide, potassium chloride, potassium bromide, magnesium chloride, sodium formate, potassium formate, cesium formate, sodium sulfate, and any combination thereof.

The fluid can be a drilling fluid, spacer fluid, workover fluid, or enhanced recovery fluid. The fluid can be introduced into the subterranean formation to perform the function of the fluid. For example, a drilling fluid can be introduced for the purposes of drilling a wellbore into the subterranean formation. The fluid can also include other additives that are soluble or insoluble in the liquid, such as but not excluding scale inhibitors, clay stabilizers, corrosion inhibitors, organic solvents, mutual solvents, and any combination thereof.

The fluid also includes the relative permeability modifier package. The relative permeability package includes at least two different relative permeability modifiers. According to any of the embodiments, a first relative permeability modifier is a surfactant, and a second relative permeability modifier is a polymer. A surfactant is an amphiphilic molecule comprising a hydrophobic tail group and a hydrophilic head group. The hydrophilic head can be charged. A cationic surfactant includes a positively charged head. An anionic surfactant includes a negatively charged head. A zwitterionic surfactant includes both a positively- and negatively charged head. A surfactant with no charge is called a non-ionic surfactant. A surfactant with a charged head can be used. By way of example, an anionic surfactant may be useful in carbonate-bearing formations, while a cationic surfactant may be useful in sandstone-bearing formations.

The surfactant can be a fatty acid, derivative of a fatty acid, or a salt thereof. The surfactant can have a head group selected from carboxylates, sulfonates, sulfates, or phosphonates. The head group can also be an acid (e.g., lauric acid) derived from an oil, such as coconut oil, or a derivative of an acid. The surfactant also includes a tail having a carbon chain length. The carbon chain length of the tail can range from $C_{10}$ to $C_{30}$. The surfactant can be selected from stearic acid or lauric acid. The surfactant can also be a salt of the acid or a derivative of the acid. By way of a non-limiting example, the surfactant can be a sodium, potassium, cesium, or ammonium salt of stearic acid. The first relative permeability modifier can include a single type of surfactant or combinations of different surfactants.

The first or the first and second relative permeability modifiers can be soluble in the liquid of the fluid. The liquid can be water. The liquid can also include a water-soluble salt. According to any of the embodiments, the first or the first and second relative permeability modifiers are water soluble. A salt of the acid may be used to be water soluble. As used herein, "soluble" means at least about 0.1 weight percent of the relative permeability modifier is soluble in the solvent at a temperature of 74° F. (23.3° C.) and a pressure of 1 atmosphere. According to any of the other embodiments, the surfactant relative permeability modifier is water insoluble, and the fluid further comprises a mutual solvent for the relative permeability modifier. Examples of mutual solvents include but are not limited to Musol, isopropyl alcohol, or ethylene glycol. The mutual solvent can be included in the fluid in a concentration of 1 to 99% by volume of the liquid. The mutual solvent can be selected based on the type of acid or the specific salt of the acid that is used as the relative permeability modifier such that the surfactant is soluble in the mutual solvent or in combination with water. The hydrophilic head group as well as the carbon chain length of the tail can be selected such that the surfactant is soluble in water, the mutual solvent, or a combination of the water and mutual solvent. Additionally, a salt of the acid can be used to increase the solubility of the surfactant. By ensuring that the relative permeability modifier is soluble in the fluid allows the fluid to be pumpable and allows the relative permeability modifier to easily coat the surfaces of the portion of the subterranean formation.

The first relative permeability modifier (RPM) that is a surfactant can be included in the fluid at a concentration in a range of 0.01% to 50% by weight of the liquid, 0.1% to 10%, or 0.25% to 3% by weight of the liquid. The first RPM surfactant can be added to the liquid of the treatment fluid in a solution.

The second relative permeability modifier is a polymer. The second relative permeability modifier can include a single, specific polymer or combinations of different polymers or polymers with different monomers, molecular weights, etc. The polymer can be prepared from a variety of hydrophilic monomers and hydrophobically modified hydrophilic monomers. Examples of hydrophilic monomers include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide, and hydroxyethyl acrylate. Of these, acrylamide, 2-acrylamido-2-methyl propane sulfonic acid, acrylic acid, dimethylaminoethyl methacrylate and vinyl pyrrolidone are preferred.

A variety of hydrophobically modified monomers can also be used to form the polymers. Hydrophobically modified monomers include, but are not limited to, alkyl acrylates, alkyl methacrylates, alkyl acrylamides, alkyl methacrylamides, alkyl dimethylammoniumethyl methacrylate bromide, alkyl dimethylammoniumethyl methacrylate chloride, alkyl dimethylammoniumethyl methacrylate iodide, alkyl dimethylammonium-propylmethacrylamide bromide, alkyl dimethylammonium propylmethacrylamide chloride, and alkyl dimethylammonium propylmethacrylamide iodide, wherein the alkyl groups have from about 4 to about 22 carbon atoms. Of these, octadecyldimethylammoniumethyl methacrylate bromide, hexadecyldimethyl-ammoniumethyl methacrylate bromide, hexadecyldimethylammoniumpropyl methacrylamide bromide, 2-ethylhexyl methacrylate, and hexadecyl methacrylamide are preferred.

The polymer can be prepared by polymerizing any one or more of the hydrophilic monomers with any one or more of the hydrophobically modified hydrophilic monomers. The polymer can be water soluble. While the polymerization reaction can be performed in various ways, an example of a particularly suitable procedure for polymerizing water-soluble monomers is as follows. Into a 250 mL-3 neck round bottom flask, charge the following: 47.7 g DI water, 1.1 g acrylamide and 0.38 g alkyl dimethylammoniumethyl methacrylate bromide. The solution formed is sparged with nitrogen for approximately 30 minutes, followed by the addition of 0.0127 g of 2,2'-azobis(2-amidinopropane) dihydrochloride. The resulting solution is then heated, while stirring to 110° F. (43.3° C.) and held for 18 hours to produce a highly viscous polymer solution.

The polymer can be water insoluble. When the hydrophobically modified hydrophilic monomer is not water soluble (e.g., octadecylmethacrylate), the following procedure can be utilized. Into a 250 mL-3 neck round bottom flask, charge the following: 41.2 g DI water and 1.26 g acrylamide. The solution formed is sparged with nitrogen for approximately 30 minutes, followed by the addition of 0.06 g of octadecyl methacrylate and 0.45 g of a cocoamidopropyl betaine surfactant. The mixture is stirred until a homogeneous, clear solution is obtained followed by the addition of 0.0055 g of 2,2'-azobis(2-amidinopropane) dihydrochloride. The resulting solution is then heated, while stirring to 110° F. (43.3° C.) and held for 18 hours to produce a highly viscous polymer solution.

In addition, the polymerization procedure can employ a hydrocarbon reaction medium instead of water. In this case, appropriate surfactants can be used to emulsify the hydrophilic/hydrophobic monomers, and the product is obtained as an oil external/water internal emulsion.

The polymer can have estimated molecular weights in a range of 100,000 to 3,000,000 and have mole ratios of the hydrophilic monomer(s) to the hydrophobically modified hydrophilic monomer(s) in a range of 99.98:0.02 to 80:20.

The second relative permeability modifier that is a polymer solution can be included in the fluid at a concentration of 50 to 400 gallons per thousand gallons ("gpt") (189.3 to 1,514.2 liters per 3,785.4 liters), or 75 to 200 gpt (283.9 to 757.1 liters per 3,785.4 liters) of the fluid. The second RPM can be included in the fluid at a concentration of 5% to 40% by volume (vol. %) of the liquid. The second RPM polymer can also be in a concentration of 0.1 to 1.2 wt % of the active polymer, or 0.3 to 0.5 wt. %.

The methods include causing or allowing the first and second relative permeability modifiers to coat surfaces of the portion of the subterranean formation, wherein after coating, the final permeability to the aqueous fluid is reduced from the initial permeability. The reduction can be any percentage that reduces production of aqueous fluids. The final permeability to the aqueous fluid can be, for example, a reduction by at least 40%, 60%, or 80% from the initial permeability. By way of example, if the initial permeability to the aqueous fluid is 6 D, then the final permeability to the aqueous fluid can be less than or equal to 1.2 D. According to any of the embodiments, the final permeability to the aqueous fluid is reduced by at least 85%, at least 90%, or at least 95% from the initial permeability. The portion of the subterranean formation can have a final permeability to the aqueous fluid of less than 10 D, less than 5 D, or less than 2 D after coating. The concentration of the relative permeability modifiers can be selected such that the permeability to the aqueous fluid reaches the desired percent reduction. A higher percent reduction, for example at least 95%, means that a lower volume of water is produced along with the hydrocarbons compared to a lower percent reduction, for example 80%. The concentration of the relative permeability modifier can also be selected, based in part, on the bottomhole temperature of the portion of the subterranean formation in order to achieve the desired reduction in permeability to the aqueous fluid. By way of example, if the bottomhole temperature of the portion of the subterranean formation is anticipated to be 200° F. (93.3° C.), then the concentration of the relative permeability modifier can be increased from 2 to 3 wt. %.

The amount of hydrophobicity that the surfaces possess as a result of being coated with the relative permeability modifiers is directly related to the percentage reduction in the permeability to the aqueous fluid. This in turn is directly related to the volume of water that is produced from the subterranean formation. It is to be understood that "water" as used in the context of produced formation fluids includes any aqueous-based liquid, such as freshwater, brine, or brackish water. For example, a higher amount of hydrophobicity can increase the percent reduction of the permeability and thus decrease the volume of water that is produced. For the first RPM, the type of surfactant selected, the specific hydrophilic head group, the carbon chain length of the tail, and the concentration of the surfactant can be adjusted and/or selected to provide the desired percentage reduction in the permeability of the portion of the subterranean formation to the aqueous fluid. For the second RPM, the polymer, monomers, polymerization reaction, molecular weight, and the concentration of the polymer can be adjusted and/or selected to provide the desired percentage reduction in the permeability of the portion of the subterranean formation to the aqueous fluid. The ratio or relative concentrations of the first to the second relative permeability modifiers can also be selected to provide the desired percentage reduction in the permeability of the subterranean formation to the aqueous fluid. According to any of the embodiments, the ratio of the polymer to surfactant is in a range of 0.08:1 to 67:1 or 0.5:1 to 14:1.

The fluid can have desirable properties that allow the fluid to be pumped into the portion of the subterranean formation wherein the relative permeability modifier easily coats the surfaces of the portion of the subterranean formation. As discussed above, polymers or other relative permeability modifiers may not cause the final permeability to the aqueous fluid to be reduced by the desired percentage (e.g., at least 40%, 80%, 90%, or 95%) when the initial permeability is greater than 6 D. The surfactant as the relative permeability modifier can penetrate a desired depth into the portion of the subterranean formation, coat more of the surfaces, increase the hydrophobicity of the surfaces of the formation, and provide the desired permeability reduction in formations having an initial permeability greater than 6 D.

The relative permeability modifier also advantageously works immediately after coating the surfaces of the portion of the subterranean formation. Accordingly, the contact time of the fluid with the surfaces does not need to be several minutes to hours in order for the relative permeability modifier to increase the hydrophobicity and provide the desired permeability reduction.

Examples

Core flow tests were performed to evaluate the effectiveness of the relative permeability modifier package. The core flow tests were performed to determine the percentage decrease in permeability to an aqueous fluid and/or oil. For only the first relative permeability modifier (first RPM) as the surfactant, a solution was prepared by suspending 5 g. sodium stearate in 25 mL Musol mutual solvent and then 225 mL water was added to provide the concentration of the surfactant at 2% by weight of the solution.

For only the second relative permeability modifier (second RPM) as the polymer, a solution was prepared by adding 400 gpt (1,514.2 liters per 3,785.4 liters) polymer solution to 2% KCl by weight solution. 3 gpt (11.4 liters per 3,785.4 liters) metal carbonate surface modifier of a sodium silicate was then added to the solution. The polymer included 2-dimethylaminoethyl acrylate (DMAEA) as the monomer and polymerized wherein approximately 5% of the polymer was modified with cetyl bromide to produce modified poly (2-dimethylaminoethyl methacrylate) with a molecular weight of 500,000 to 1,200,000.

For the combined RPM package, a fluid was prepared by taking 5 g. sodium stearate and suspending in 50 mL Musol mutual solvent followed by 162.5 mL of 2% KCl by weight solution. Once dissolved, either 25 mL or 100 gpt (378.5 liters per 3,785.4 liters) or 37.5 mL or 150 gpt (567.8 liters per 3,785.4 liters) of the polymer solution was added to yield the final fluid.

Cores of calcium carbonate of approximately 6 centimeters in length were then prepared by packing a cell with calcium carbonate particles with a targeted initial permeability of 15 D. An aqueous solution of water and 2% potassium chloride salt by weight was prepared. The aqueous solution was flowed through the cores, and the initial permeability of the cores to the aqueous solution was determined using Darcy's law in Eq. 1 above. The actual initial permeability had some variation across the cores due to variations inherent in the packing of the cells. The cores were then treated with only the first RPM solution, only the second RPM solution, or the combined RPM package solution. The salt solution was flowed again through the pre-coated cores and the final permeability to the aqueous solution was determined using Darcy's law. The percent reduction in permeability to the aqueous solution was calculated as % reduction=((initial−final)/initial)*100. Table 1 shows the results of the tests.

TABLE 1

| | | Core flow test results | | | |
|---|---|---|---|---|---|
| RPM | RPM concentration | Initial permeability | Final permeability | % reduction | Temperature |
| First RPM | 2 wt. % | 14.5 D | 14.5 D | 0% | 250° F. (121.1° C.) |
| Second RPM | 400 gpt | 14.1 D | 13.9 D | 2% | 190° F. (87.8° C.) |
| First RPM & Second RPM | 2 wt. % 100 gpt | 14.100 D | 13.959 D | 99% | 205° F. (96.1° C.) |
| First RPM & Second RPM | 2 wt. % 100 gpt | 14.300 D | 11.297 D | 79% | 230° F. (110.0° C.) |
| First RPM & Second RPM | 2 wt. % 150 gpt | 13.90 D | 12.93 D | 93% | 230° F. (110.0° C.) |
| First RPM & Second RPM | 2 wt. % 150 gpt | 14.90 D | 13.41 D | 90% | 265° F. (129.4° C.) |

As can be seen in Table 1, at a temperature of 250° F. (121.1° C.), the surfactant by itself had a zero percent reduction in permeability. This indicates that there may be temperature limitations to the effectiveness of just the surfactant as a relative permeability modifier. As can also be seen when just the polymer as a relative permeability modifier was used by itself there was also a near zero percent reduction in permeability. This indicates that there may be initial permeability limitations to the effectiveness of just the polymer as a relative permeability modifier. However, as can be seen, by combining the first and second RPM (surfactant and polymer) together as a relative permeability modifier package, the percent reduction was excellent. This conclusively shows that there is a synergistic effect in the combination, which produced a combined effect that was greater than the individual RPMs alone. By way of example, when comparing the second RPM polymer by itself to the combination of the first and second RPMs, that even when the concentration of the second RPM polymer was lower at 150 gpt vs. 400 gpt and when the temperature was greater at a temperature of 265° F. (129.4° C.) vs. 190° F. (87.8° C.), there was a 90% reduction in permeability compared to the polymer by itself, which yielded a 2% reduction, which was an 88% improvement. This clearly shows that the addition of the first RPM surfactant created a synergistic effect with the second RPM polymer that increased the percent reduction by 88%. Moreover, as can be seen, the concentration of the second RPM polymer can be adjusted depending on the actual or anticipated temperature of the subterranean formation. By way of example, at a temperature of 230° F. (110.0° C.), the RPM package provided a 79% reduction when the polymer was in a concentration of 100 gpt; however, when the polymer concentration was increased to 150 gpt, the percent reduction increased to 93%. Additionally, even at temperatures of 265° F. (129.4° C.), the RPM package provided excellent percent reduction in the permeability at 90%. These results indicate that the relative permeability modifier package can be used in operations where the temperature of the subterranean formation is high (i.e., 230° F. (110.0° C.) or greater).

A test fluid consisting of the liquid, an optional solvent, and the relative permeability modifier package and in the same proportions as the fluid can have core flow test reduction in the permeability to an aqueous fluid greater than or equal to a desired percentage; compared to a control test fluid consisting of the liquid, the optional solvent, excluding either the first relative permeability modifier or the second relative permeability modifier, having a core flow test reduction in the permeability to an aqueous fluid of less than the desired percentage. It is to be understood that while the fluid can contain other ingredients, it is the relative permeability modifier package that is primarily or wholly responsible for the stated percent reduction in the permeability to an aqueous fluid compared to other fluids that only contain one of the relative permeability modifiers instead of both. It is also to be understood that any discussion related to a "test fluid" or "control test fluid" for the core flow tests is included for purposes of demonstrating that while the fluid being introduced into the portion of the subterranean formation may contain other ingredients, it is the relative permeability modifier package that provides the stated percent reduction. Therefore, while it may not be possible to perform a core flow test in a formation for the specific fluid being introduced, one can formulate a test fluid to be core flow tested in a laboratory to determine whether the specific surfactant, the specific polymer, and concentrations of the surfactant and polymer in the package will provide the stated percent reduction at the temperature of the subterranean formation. While it is also possible for an operator at the wellhead to determine the effectiveness of the fluid in reducing the permeability of the formation to an aqueous fluid by monitoring the volume of water produced along with hydrocarbons, one can still perform core flow testing in a laboratory to select the specific surfactant and polymer to be used, the specific hydrophilic head, carbon chain length of the tail, molecular weight, etc., and concentrations based on the specific substances in the portion of the subterranean formation and anticipated bottomhole temperature.

An embodiment of the present disclosure is a method of treating a portion of a subterranean formation comprising: introducing a fluid into the portion of the subterranean formation that has an initial permeability to an aqueous fluid, wherein the fluid comprises: a liquid; and a relative permeability modifier package, wherein the relative permeability modifier package comprises: a first relative permeability modifier that is a surfactant; and a second relative permeability modifier that is a polymer; and causing or allowing the first and second relative permeability modifiers to coat surfaces of the portion of the subterranean formation, wherein after coating, a final permeability to the aqueous fluid is reduced from the initial permeability. Optionally, the portion of the subterranean formation is part of a sandstone-bearing formation, carbonate-bearing formation, or combinations thereof. Optionally, the subterranean formation contains a reservoir fluid, and wherein the reservoir fluid comprises an aqueous liquid and hydrocarbons in liquid, gas, or both liquid and gas forms. Optionally, the methods further comprise producing the reservoir fluid from the subterranean formation. Optionally, the portion of the subterranean formation has a bottomhole temperature greater than or equal to 230° F. (110.0° C.). Optionally, the initial permeability to the aqueous fluid is greater than or equal to 6 Darcy. Optionally, the liquid comprises water, and wherein the water is selected from the group consisting of freshwater, seawater, brine, and any combination thereof in any proportion. Optionally, the first and second relative permeability modifiers are water soluble. Optionally, the first relative permeability modifier is water insoluble, wherein the fluid further comprises a mutual solvent, and wherein the relative permeability modifier is soluble in the mutual solvent. Optionally, the first relative permeability modifier is a fatty acid, a derivative of a fatty acid, or a salt thereof. Optionally, the fatty acid is selected from the group consisting of stearic acid, lauric acid, palmitic acid, and combinations thereof. Optionally, the first relative permeability modifier is in a concentration in a range of 0.01% to 50% by weight of the liquid. Optionally, the polymer comprises a hydrophilic monomer and a hydrophobically modified monomer. Optionally, the hydrophilic monomer is selected from acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide, or hydroxyethyl acrylate. Optionally, the hydrophobically modified monomer is selected from alkyl acrylates, alkyl methacrylates, alkyl acrylamides, alkyl methacrylamides, alkyl dimethylammoniumethyl methacrylate bromide, alkyl dimethylammoniumethyl methacrylate chloride, alkyl dimethylammoniumethyl methacrylate iodide, alkyl dimethylammonium-propylmethacrylamide bromide, alkyl dimethylammonium propylmethacrylamide chloride, or alkyl dimethylammonium propylmethacrylamide iodide, wherein the alkyl groups have from 4 to 22 carbon atoms. Optionally, the polymer has a molecular weight in a range of 100,000 to 3,000,000 and has a mole ratio of the hydrophilic monomer to the hydrophobically modified hydrophilic monomer in a range of 99.98:0.02 to 80:20. Optionally, the second relative permeability modifier is in a concentration of 50 to 400 gallons per thousand gallons (189.3 to 1,514.2 liters per 3,785.4 liters). Optionally, the final permeability to the aqueous fluid is reduced by at least 40% from the initial permeability. Optionally, the permeability to the aqueous fluid is reduced by at least 80% from the initial permeability. Optionally, the relative permeability modifier increases the hydrophobicity of the coated surfaces of the portion of the subterranean formation.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole, such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more relative permeability modifiers, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a subterranean formation comprising:
    introducing a fluid into the portion of the subterranean formation that has an initial permeability to an aqueous fluid, wherein the fluid comprises:
        a liquid; and
        a relative permeability modifier package, wherein the relative permeability modifier package comprises:
            a first relative permeability modifier that is a surfactant, wherein the first relative permeability modifier is a fatty acid, a derivative of a fatty acid, or a salt thereof; and
            a second relative permeability modifier that is a polymer, wherein the polymer comprises a hydrophilic monomer and a hydrophobically modified monomer; and
    causing or allowing the first and second relative permeability modifiers to coat surfaces of the portion of the subterranean formation, wherein after coating, a final permeability to the aqueous fluid is reduced from the initial permeability.

2. The method according to claim 1, wherein the portion of the subterranean formation is part of a sandstone-bearing formation, carbonate-bearing formation, or combinations thereof.

3. The method according to claim 1, wherein the subterranean formation contains a reservoir fluid, and wherein the reservoir fluid comprises an aqueous liquid and hydrocarbons in liquid, gas, or both liquid and gas forms.

4. The method according to claim 3, further comprising producing the reservoir fluid from the subterranean formation.

5. The method according to claim 1, wherein the portion of the subterranean formation has a bottomhole temperature greater than or equal to 230° F. (110.0° C.).

6. The method according to claim 1, wherein the initial permeability to the aqueous fluid is greater than or equal to 6 Darcy.

7. The method according to claim 1, wherein the liquid comprises water, and wherein the water is selected from the group consisting of freshwater, seawater, brine, and any combination thereof in any proportion.

8. The method according to claim 7, wherein the first relative permeability modifier is water insoluble, wherein the fluid further comprises a mutual solvent, and wherein the first relative permeability modifier is soluble in the mutual solvent.

9. The method according to claim 1, wherein the fatty acid is selected from the group consisting of stearic acid, lauric acid, palmitic acid, and combinations thereof.

10. The method according to claim 1, wherein the first relative permeability modifier is in a concentration in a range of 0.01% to 50% by weight of the liquid.

11. The method according to claim 1, wherein the hydrophilic monomer is selected from acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide, or hydroxyethyl acrylate.

12. The method according to claim 1, wherein the hydrophobically modified monomer is selected from alkyl acrylates, alkyl methacrylates, alkyl acrylamides, alkyl methacrylamides, alkyl dimethylammoniumethyl methacrylate bromide, alkyl dimethylammoniumethyl methacrylate chloride, alkyl dimethylammoniumethyl methacrylate iodide, alkyl dimethylammonium-propylmethacrylamide bromide, alkyl dimethylammonium propylmethacrylamide chloride, or alkyl dimethylammonium propylmethacrylamide iodide, wherein the alkyl groups have from 4 to 22 carbon atoms.

13. The method according to claim 1, wherein the polymer has a molecular weight in a range of 100,000 to 3,000,000 and has a mole ratio of the hydrophilic monomer to the hydrophobically modified monomer in a range of 99.98:0.02 to 80:20.

14. The method according to claim 1, wherein the second relative permeability modifier is in a concentration of 50 to 400 gallons per thousand gallons (189.3 to 1,514.2 liters per 3,785.4 liters).

15. The method according to claim 1, wherein the final permeability to the aqueous fluid is reduced by at least 40% from the initial permeability.

16. The method according to claim 1, wherein the final permeability to the aqueous fluid is reduced by at least 80% from the initial permeability.

17. The method according to claim 1, wherein the first and second relative permeability modifiers increase the hydrophobicity of the coated surfaces of the portion of the subterranean formation.

18. A method of treating a portion of a subterranean formation comprising:
introducing a fluid into the portion of the subterranean formation that has an initial permeability to an aqueous fluid, wherein the fluid comprises:
- a liquid, wherein the liquid comprises water, and wherein the water is selected from the group consisting of freshwater, seawater, brine, and any combination thereof in any proportion;
- a mutual solvent; and
- a relative permeability modifier package, wherein the relative permeability modifier package comprises:
  - a first relative permeability modifier that is a surfactant, wherein the first relative permeability modifier is water insoluble, and wherein the first relative permeability modifier is soluble in the mutual solvent; and
  - a second relative permeability modifier that is a polymer, wherein the polymer comprises a hydrophilic monomer and a hydrophobically modified monomer; and causing or allowing the first and second relative permeability modifiers to coat surfaces of the portion of the subterranean formation, wherein after coating, a final permeability to the aqueous fluid is reduced from the initial permeability.

19. The method according to claim 18, wherein the initial permeability to the aqueous fluid is greater than or equal to 6 Darcy.

20. The method according to claim 18, wherein the final permeability to the aqueous fluid is reduced by at least 40% from the initial permeability.

* * * * *